(12) United States Patent
Mignet et al.

(10) Patent No.: US 7,986,848 B2
(45) Date of Patent: *Jul. 26, 2011

(54) METHODS, SYSTEMS, AND COMPUTER PROGRAM PRODUCTS FOR A MULTI-RESOLUTION STORAGE SCHEME FOR HISTORICAL DATA

(75) Inventors: Laurent S. Mignet, New Delhi (IN); Sourashis Roy, New Delhi (IN); Jayanta Basak, New Delhi (IN); Raghavendra Singh, New Delhi (IN); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 931 days.

This patent is subject to a terminal disclaimer.

(21) Appl. No.: 11/853,063

(22) Filed: Sep. 11, 2007

(65) Prior Publication Data
US 2009/0067735 A1 Mar. 12, 2009

(51) Int. Cl.
*G06K 9/46* (2006.01)
(52) U.S. Cl. ......... 382/240; 382/239; 382/244; 382/232
(58) Field of Classification Search .................. 382/232, 382/240, 239, 244, 111, 156; 1/1; 345/420, 345/426; 702/6, 10; 707/999.1
See application file for complete search history.

(56) References Cited

U.S. PATENT DOCUMENTS

| | | | |
|---|---|---|---|
| 4,571,634 A | 2/1986 | Caneschi et al. | |
| 5,594,598 A | 1/1997 | Shikakura | |
| 5,915,069 A | 6/1999 | Nishijima | |
| 6,141,445 A | 10/2000 | Castelli et al. | |
| 6,188,831 B1 | 2/2001 | Ichimura | |
| 6,476,805 B1* | 11/2002 | Shum et al. | 345/420 |
| 6,718,121 B1 | 4/2004 | Shikunami | |
| 6,813,312 B2 | 11/2004 | Tullberg et al. | |
| 2003/0018802 A1 | 1/2003 | Romanik et al. | |
| 2004/0146214 A1 | 7/2004 | Marks | |
| 2009/0070347 A1* | 3/2009 | Mignet et al. | 707/100 |

FOREIGN PATENT DOCUMENTS
EP 0494335 A2 7/1992

OTHER PUBLICATIONS

More G Mail; http://bhanoo.blogspot.com/2005_04_01_bhanoo_archive.html; 16 pages.
Mike W. Mitte, Real Time Monitoring and Data History for Commercial Aviation, OSI Software, Inc., 12 pages.
Peng Jiang, et al., Research on Compression Method Based on Integer Wavelet Transform and SPIHT for Historical Data in Process Industry, Proceedings of the First International Multi-Symposiums on Computer and Computational Sciences (IMSCCS'06), Copyright 2006 IEEE Computer Society, 5 pages.

* cited by examiner

*Primary Examiner* — Anh Hong Do
(74) *Attorney, Agent, or Firm* — Cantor Colburn LLP; Derek Jennings

(57) ABSTRACT

A method, system, and computer program product for a multi-resolution storage scheme for historical data are provided. The method includes dividing the historical data into a plurality of time frames and determining an amount of compression for each of the time frames, where at least two of the time frames have a different amount of compression. The method further includes applying the amount of compression to each of the time frames, resulting in multi-resolution historical data, and storing the multi-resolution historical data.

1 Claim, 4 Drawing Sheets

METHODS, SYSTEMS, AND COMPUTER PROGRAM PRODUCTS FOR A MULTI-RESOLUTION STORAGE SCHEME FOR HISTORICAL DATA

BACKGROUND OF THE INVENTION

The present disclosure relates generally to data storage, and, in particular, to a multi-resolution storage scheme for historical data.

Since society is increasingly relying on computer systems for smooth and efficient operation, the demand for computer systems to run without interruption for long intervals of time has correspondingly grown. A monitoring tool may be used to monitor a computer system's performance and indicate whether the computer system's performance has or will deteriorate over time. Such a monitoring tool can provide an early warning of a developing problem before the monitored computer system reaches a point of severely degraded performance or failure. Using information provided by the monitoring tool, system parameters can be adjusted to maintain and/or improve performance of the monitored computer system. For an early warning system to properly predict problems, a significant volume of historical data is generally required to make statistically significant predictions. Therefore, historical data must be collected over long intervals of time to enable accurate predictions.

The collection of a large volume of data can lead to potential storage issues, such as a high total cost of storage. Data compression can reduce the amount of space needed to store data, but the accuracy of the compressed data is typically degraded, as granularity is diminished during the compression process. In monitoring and prediction systems, it is important that recent data be more precise as compared to older data, because the recent data is more significant for prediction purposes. Therefore, to increase storage efficiency, it would be beneficial to develop a flexible compression technique, adjusting for factors such as storage and error tolerance constraints through non-uniform compression ratios. Accordingly, there is a need in the art for a multi-resolution storage scheme for historical data.

BRIEF SUMMARY OF THE INVENTION

Embodiments of the invention include method for a multi-resolution storage scheme for historical data. The method includes dividing the historical data into a plurality of time frames and determining an amount of compression for each of the time frames, where at least two of the time frames have a different amount of compression. The method further includes applying the amount of compression to each of the time frames, resulting in multi-resolution historical data, and storing the multi-resolution historical data.

Additional embodiments include a system for a multi-resolution storage scheme for historical data. The system includes a database and a host system in communication with the database. The host system executes a compression layer (CL). The CL receives the historical data and divides the historical data into a plurality of time frames. The CL further performs determining an amount of compression for each of the time frames, where at least two of the time frames have a different amount of compression. The CL also applies the amount of compression to each of the time frames, resulting in multi-resolution historical data, and stores the multi-resolution historical data in the database.

Further embodiments include a computer program product for a multi-resolution storage scheme for historical data. The computer program product includes a storage medium readable by a processing circuit and storing instructions for execution by the processing circuit for implementing a method. The method includes dividing the historical data into a plurality of time frames and determining an amount of compression for each of the time frames, where at least two of the time frames have a different amount of compression. The method further includes applying the amount of compression to each of the time frames, resulting in multi-resolution historical data, and storing the multi-resolution historical data.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments, as shown and described by the various figures and the accompanying text, provide methods, systems and computer program products for a multi-resolution storage scheme for historical data. Through applying different compression ratios for different time frames of historical data, depending on storage and error tolerance constraints, efficient storage and retrieval of historical data may be achieved. In exemplary embodiments, a time series of historical data is divided into several time frames. The amount of compression for each of the time frames may be specified. Alternatively, or in addition thereto, the amount of error tolerated for each of the time frames can be specified. When error tolerances are specified, optimal compression ratios that satisfy the error tolerances can be calculated and applied. For example, if the historical data contains fifty hours of data, the historical data can be divided into five time frames, with each time frame spanning ten hours. For each of the five time frames, a separate compression and/or error tolerance can be applied.

In exemplary embodiments, each time frame supports specifying an amount of error between the compressed version and the original version of the time frame. Alternatively, default optimal compression ratios that satisfy error tolerances can be applied to each time frame. It can be helpful to both specify and measure the error attributable to compression. For example, the error measure may be useful to a system administrator for determining whether the compressed data is accurate enough to support analyzing system performance.

In exemplary embodiments, the time and computing effort to retrieve the compressed data from an archive is adaptive. Older (less recent) data can be archived such that it requires more computational cycles and time to retrieve it, while younger (more recent) data may be easier to retrieve. In exemplary embodiments, the older data is grouped together to form a two dimensional "image", and the image is compressed. For younger data, single dimensional frames may be used, i.e., each time series of historical data is compressed independently. Image-type compression may enable a higher degree of compression at the expense of greater computational complexity. In alternate exemplary embodiments, the compression ratio for the historical data is improved through merging two consecutive compressed frames and shrinking the merged compressed frame by dropping the oldest data.

Figure 1:
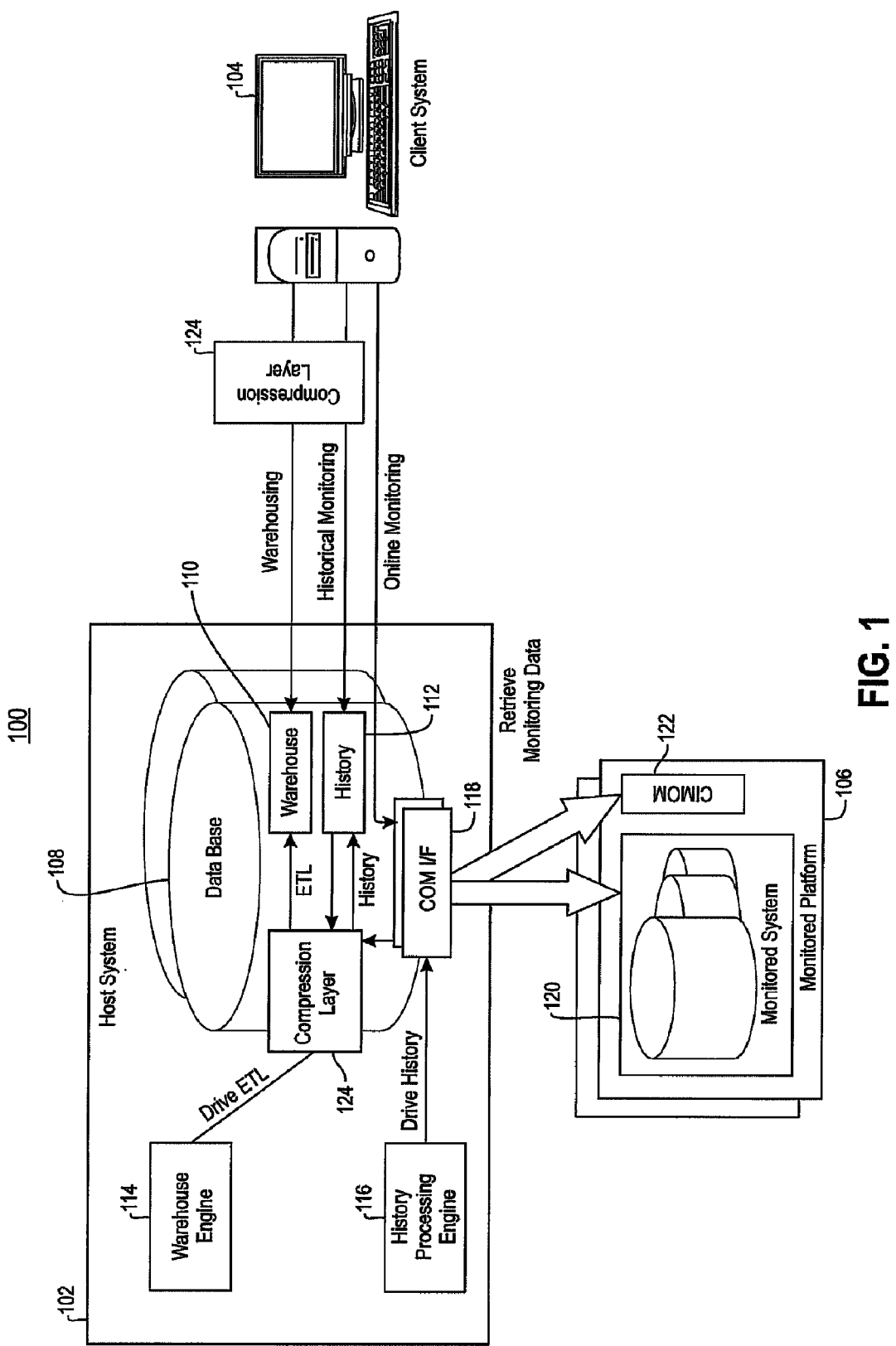
FIG. 1 depicts a system for a multi-resolution storage scheme for historical data in accordance with exemplary embodiments.

Turning now to the drawings, it will be seen that in FIG. 1 there is a block diagram of a system 100 upon which a multi-resolution storage scheme for historical data is implemented in exemplary embodiments. The system 100 of FIG. 1 includes a host system 102 in communication with a client system 104 and a monitored platform 106. The host system 102 may be a high-speed processing device (e.g., a mainframe computer), including a processing circuit for executing instructions, which handles processing requests from the client system 104 and monitors the monitored platform 106. In exemplary embodiments, the host system 102 functions a data management server for the client system 104 and as a performance monitor for the monitored platform 106, such as IBM® DB2® Performance Expert. The client system 104 may comprise a desktop or general-purpose computer device that generates data access and monitoring requests, such as access requests to historical monitoring data associated with the monitored platform 106. While only a single host system 102, client system 104, and monitored platform 106 are shown in FIG. 1, it will be understood that any number of host systems 102, client systems 104, and/or monitored platforms 106 may be implemented within the scope of the invention. For example, multiple host systems 102 may monitor different systems within the monitored platform 106. In alternate exemplary embodiments, the host system 102 is directly user accessible without a separate client system 104, e.g., where the host system 102 is embodied in a desktop computer or workstation.

In exemplary embodiments, the host system 102 includes at least one database 108. The database 108 may be embodied in any storage format or medium known in the art, e.g., a collection of files or tables on a hard disk device. The database 108 may hold a variety of data, such as performance data associated with the monitored platform 106. In exemplary embodiments, the database 108 includes warehouse data 110 and history data 112. The warehouse data 110 may include long-term time series of historical data, such as summarized performance parameters associated with the monitored platform 106, as written via a warehouse engine 114. The history data 112 may include shorter-term time series of historical data as written via a history processing engine 116, e.g., the last fifty hours of performance parameters from the monitored platform 106. In exemplary embodiments, the host system 102 retrieves monitoring data from the monitored platform 106 through a communication interface 118. The communication interface 118 may support any communication protocol and transmission medium known in the art. The host system 102 may communicate with a monitored system 120 and/or a common information model object manager (CIMOM) 122 in the monitored platform 106 via the communication interface 118. In exemplary embodiments, the CIMOM 122 collects performance data for the online monitoring, short-term history, long-term history, and exception processing for the monitored system 120. The CIMOM 122 may be utilized if the monitored platform 106 supports common information models for describing platform or system management properties; however, the CIMOM 122 can alternatively be omitted.

The host system 102 also includes a compression layer (CL) 124. In exemplary embodiments, the CL 124 acts as a compression/decompression layer for storage and retrieval of the warehouse data 110 and the history data 112. The client system 104 may have a local copy of the CL 124 to support retrieval of warehouse data 110 and the history data 112, with the associated processing performed locally to the client system 104. In exemplary embodiments, the history data 112 is periodically migrated into the warehouse data 110 using an extract transform load (ETL) process. During the ETL process the history data 112 is compressed using the CL 124 to reduce the amount of data stored in the warehouse data 110. By routing access and storage requests for the warehouse data 110 and the history data 112 through the CL 124, the CL 124 can control the compression format of the data without requiring extensive modifications to other interfaces or applications that attempt to read or write the data.

Figure 2:
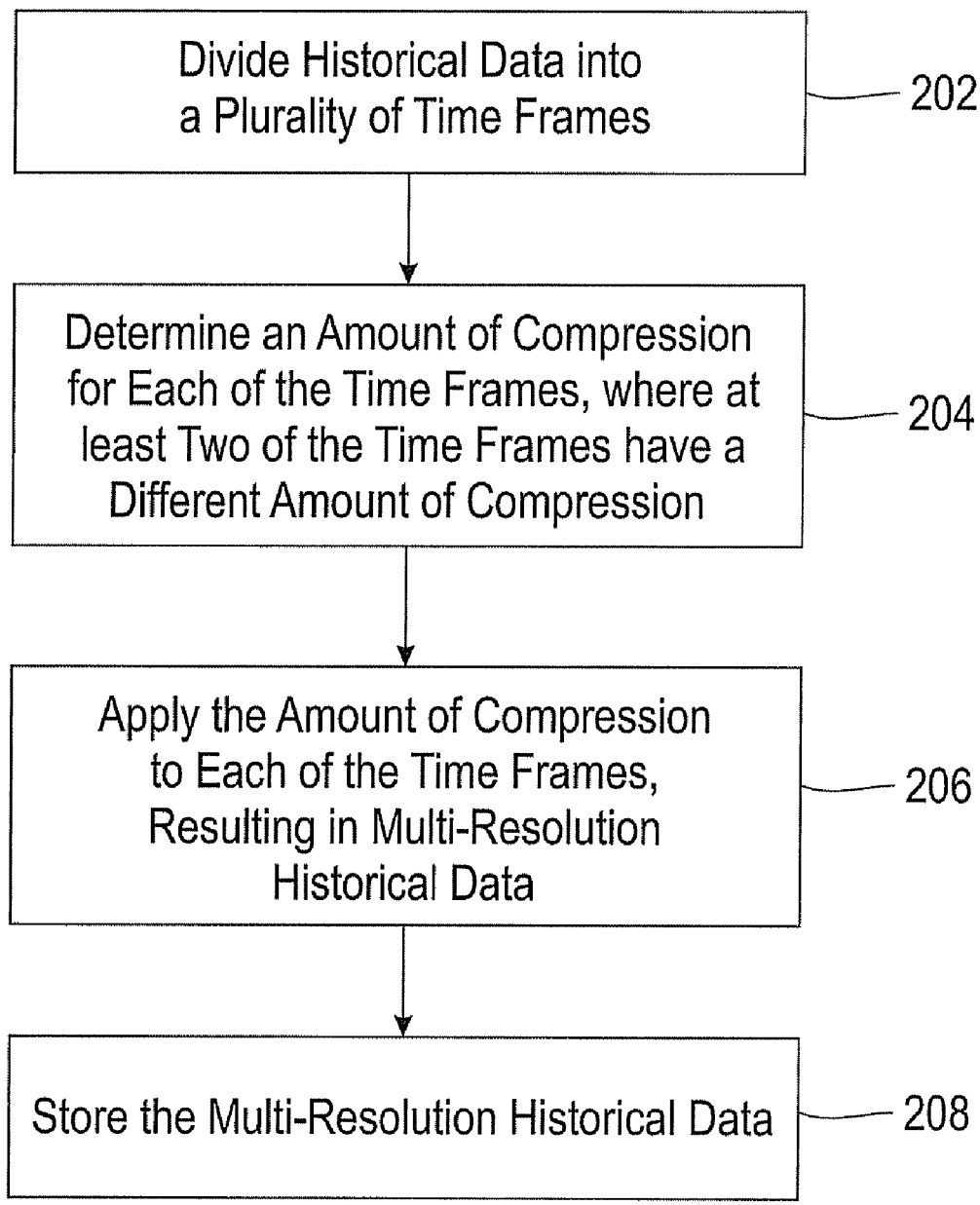
FIG. 2 depicts a process for a multi-resolution storage scheme for historical data in accordance with exemplary embodiments.

Turning now to FIG. 2, a process 200 for a multi-resolution storage scheme for historical data will now be described in accordance with exemplary embodiments in reference to the system 100 of FIG. 1. In exemplary embodiments, the host system 102 executes the CL 124 to perform a multi-resolution storage scheme for historical data. The CL 124 may receive historical data from a variety of sources, such as data acquired from the monitored platform 106. The CL 124 may write the compressed data to the database 108, including the warehouse data 110 and/or the history data 112.

At block 202, the CL 124 divides the historical data into a plurality of time frames. For example, fifty hours of historical data can be divided into five time frames, with each time frame spanning ten hours. Alternatively, the time frames can be of non-uniform duration, e.g., the most recent three hours, the next five hours, and so forth.

At block 204, the CL 124 determines an amount of compression for each of the time frames. The amount of compression can vary between each frame, resulting in multi-resolution historical data. In exemplary embodiments, at least two of the time frames have a different amount of compression. The amount of compression may be calculated based on a requested error tolerance for the time frames. Alternatively, the amount of compression may be calculated based on space constraints for storing the multi-resolution historical data. For example, the CL 124 can analyze the space available in the database 108 to store the historical data, the volume of data to store, and determine an amount of compression that will most likely be sufficient for the given scenario. Additionally, the amount of compression may be based on default values that are considered optimal for the given application.

At block 206, the CL 124 applies the amount of compression, as determined in block 204, to each of the time frames. In exemplary embodiments, a greater amount of compression is applied to older time frames than to younger time frames. For multiple series of historical data, the CL 124 may apply multiple dimension compression. Using multiple dimension compression, older series of the historical data can be compressed as a two-dimensional image, and younger series of the historical data can be compressed in a single dimension. This approach may provide greater compression for the older series of the historical data, at a cost of greater computational complexity and reduced granularity.

Although any number of compression techniques known in the art may be applied in compressing the historical data, in exemplary embodiments, the compression is applied via a wavelet transform and output as wavelet coefficients. The wavelet coefficients may be generated as one or more levels of approximation and detail coefficients with varying amounts of resolution. The CL 124 can further compress the wavelet coefficients via Huffman coding or other lossless encoding techniques known in the art.

At block 208, the CL 124 stores the multi-resolution historical data. When the CL 124 applies a wavelet transform as the method of compression, the multi-resolution historical data may be stored in the database 108 as wavelet coefficients or compressed wavelet coefficients. As further described herein, the CL 124 may also support merging of compressed time frames of historical data via a time series merger with partial reconstruction. The CL 124 may further support removing historical data from the multi-resolution historical data via identifying the wavelet coefficients associated with a portion of the historical data to retain, and discarding remaining unidentified wavelet coefficients. In exemplary embodiments, the CL 124 reconstructs the historical data through applying an inverse wavelet transform to the wavelet coefficients. The reconstructed historical data can be output to the client system 124 for viewing or further analysis. The CL 124 may also calculate an error metric as a mean square error between the historical data and the reconstructed historical data, and output the error metric. Further details associated with the process 200 are provided herein.

As previously stated, the CL 124 may employ any number of compression techniques known in the art. For purposes of explanation, a compression technique using a wavelet transform is further described herein as one example of a compression technique; however, it will be understood that the scope of the invention is not so limited. For example, CL 124 may alternatively employ ZIP, LZ, and other such compression techniques for the compression of time frames of historical data. A wavelet transform is capable of providing both the time and frequency information simultaneously, hence giving a time-frequency representation of a time series. A wavelet serves as a mathematical model to transform a signal into an alternate vector space. The advantage of the transformed space is that there are few "coefficient" data points in this space in which most of the signal energy is concentrated, while most of the coefficients have very low energy. Here, "energy" is defined as the variance of a data point. By keeping only a few data points in the transformed space, most of the energy of the signal is preserved. A wavelet transform can be performed efficiently by iteratively convolving a signal with one or more filters to produce wavelet coefficients. For example, assume that two signals u and v are convolved as signal uv. Further suppose $l_u$=length (u) and $l_v$=length (v). Then uv will be a vector of length $l_u+l_v-1$ whose $j^{th}$ element is given by $$uv(j) = \sum_i u(i)v(j+1-i) \quad (1)$$

Resulting in $$uv(1)=u(1)\times v(1)$$

$$uv(2)=u(1)\times v(2)+u(2)\times v(1)$$

...

$$uv(n)=u(1)\times v(n)+u(2)\times v(n-1)+u(3)\times v(n-2)+ \ldots +u(n)\times v(1)$$

There are a number of known wavelet filters, the most well known among them being Haar Wavelets and Daubechies Wavelets. Wavelet filters can be categorized into two classes: decomposition filters used for decomposing a signal, and reconstruction filters used for reconstructing the original signal from the wavelet coefficients. There are two types of decomposition filters: low pass decomposition filters and high pass decomposition filters, which are denoted as Lo_D and Hi_D respectively for purposes of explanation. Similarly, for reconstruction, low pass and high pass reconstruction filters are used, which are denoted as Lo_R and Hi_R respectively. All four types of filters belonging to one category are of the same length, which is denoted as 2p. For example, a Haar Wavelet consists of a set of four filters Lo_D, Hi_D, Lo_R, and Hi_R, each of length 2, given as [0.7071 0.7071], [-0.7071 0.7071], [0.7071 0.7071], and [0.7071-0.7071]. Similarly, for other wavelet filters, there are sets of two decomposition filters and two reconstruction filters.

Figure 3:
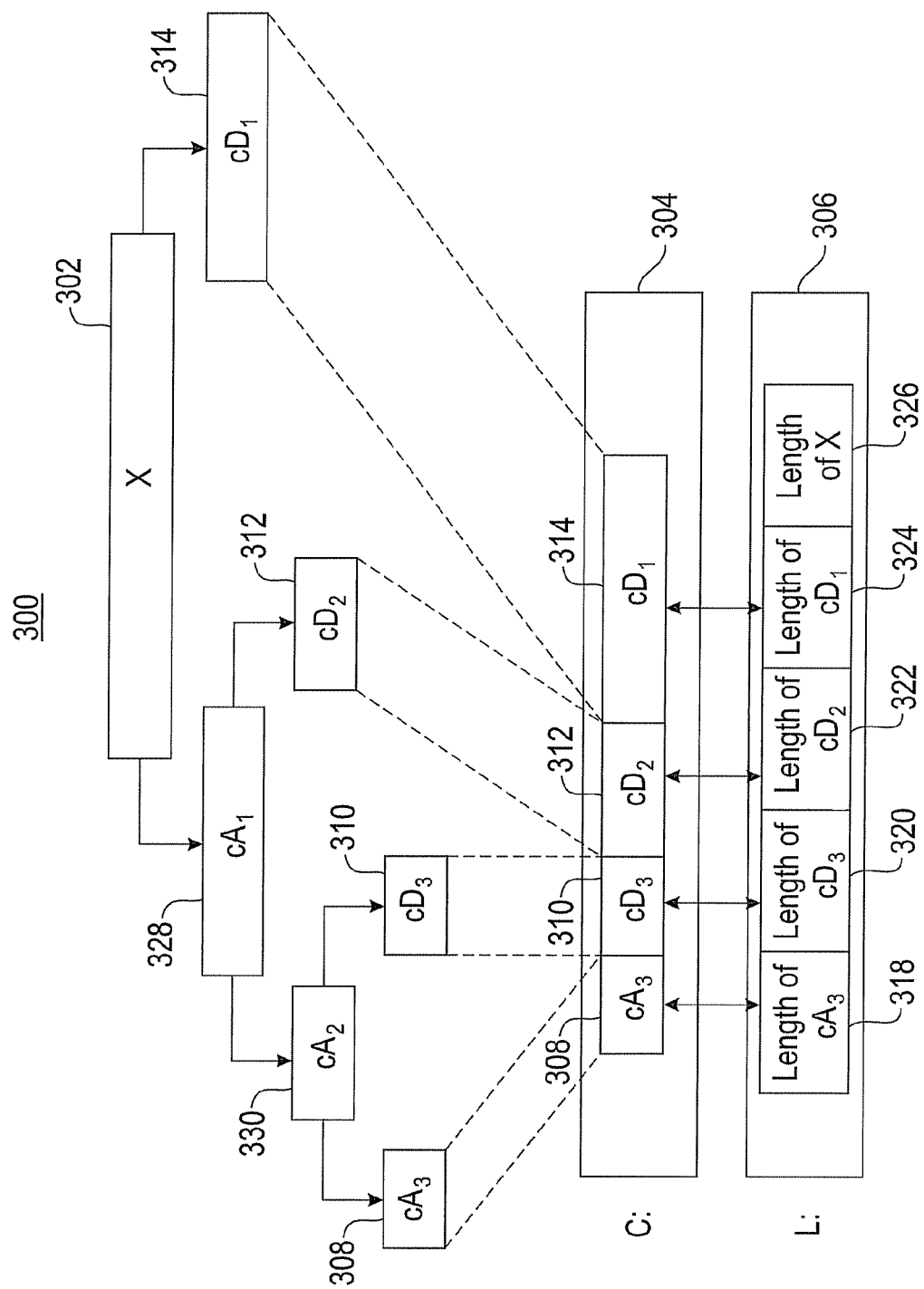
FIG. 3 depicts an exemplary wavelet coefficient storage data structure.

Turning now to FIG. 3, an exemplary wavelet coefficient storage data structure 300 is depicted as a three level decomposition of a signal x 302, which may be implemented by the CL 124 of FIG. 1. In exemplary embodiments, C 304 and L 306 are two data structures that are used to store wavelet coefficients and their corresponding metadata. C 304 stores the values of the wavelet coefficients, $cA_3$ 308, $cD_3$ 310, $cD_2$ 312, and $cD_1$ 314. L 306 stores wavelet coefficient lengths, including $cA_3$ length 318, $cD_3$ length 320, $cD_2$ length 322, and $cD_1$ length 324, as well as input signal x length 326. In general, $cA_j$ and $cD_j$ are referred to as "approximation" and "detail" coefficients respectively at level j. As the number of levels increases, the resolution and granularity of the information captured in the approximation and detail coefficients may increase, reducing the amount of error induced through the compression and decompression process.

Figure 4:
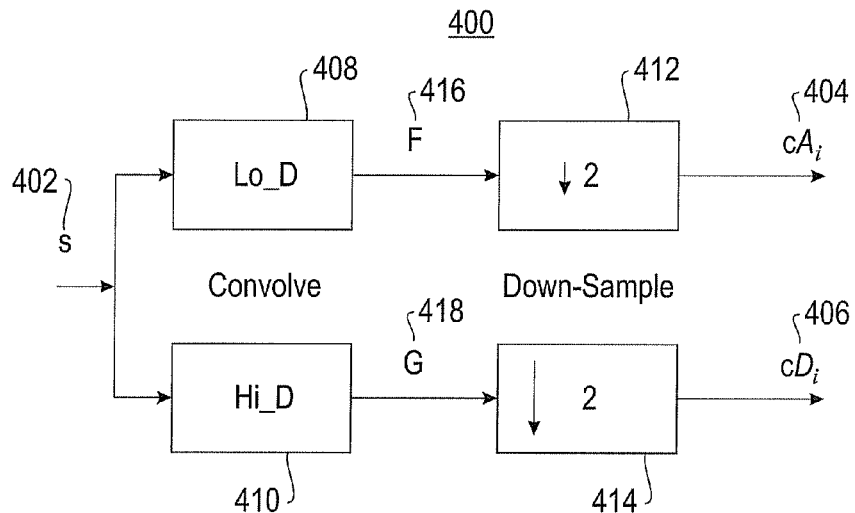
FIG. 4 depicts an exemplary process for wavelet coefficient generation.

Turning now to FIG. 4, a process 400 for wavelet coefficient generation is described in reference to FIG. 3, which may be implemented by the CL 124 of FIG. 1. Given a signal s 402 of length n, two sets of coefficients are generated: approximation coefficients $cA_j$ 404 and detail coefficients $cD_j$ 406. These are obtained by convolving s 402 with a low-pass filter Lo_D 408 for approximation, and with the high-pass filter Hi_D 410 for detail, followed by dyadic decimation (down sampling) via down-samplers 412 and 414 respectively. The length of each filter 408 and 410 is denoted by 2p. If n=length(s 402), the signals F 416 and G 418 are of length n+2p-1, and the coefficients $cA_j$ 404 and $cD_j$ 406 are of length $$\left\lfloor \frac{n-1}{2} \right\rfloor + p$$

because the signals F 416 and G 418 are down-sampled by two. Applying the process 400 to the top level of FIG. 3, where signal x 302 of FIG. 3 is equivalent to signal s 402 of FIG. 4, results in $cA_1$ 328 and $cD_1$ 314. Similarly, at level two, the approximation coefficient $cA_1$ 328 is split into two parts using the same scheme, replacing s 402 with $cA_1$ 328, and producing $cA_2$ 330 and $cD_2$ 312. The process 400 is repeated until level j decomposition is achieved.

Figure 5:
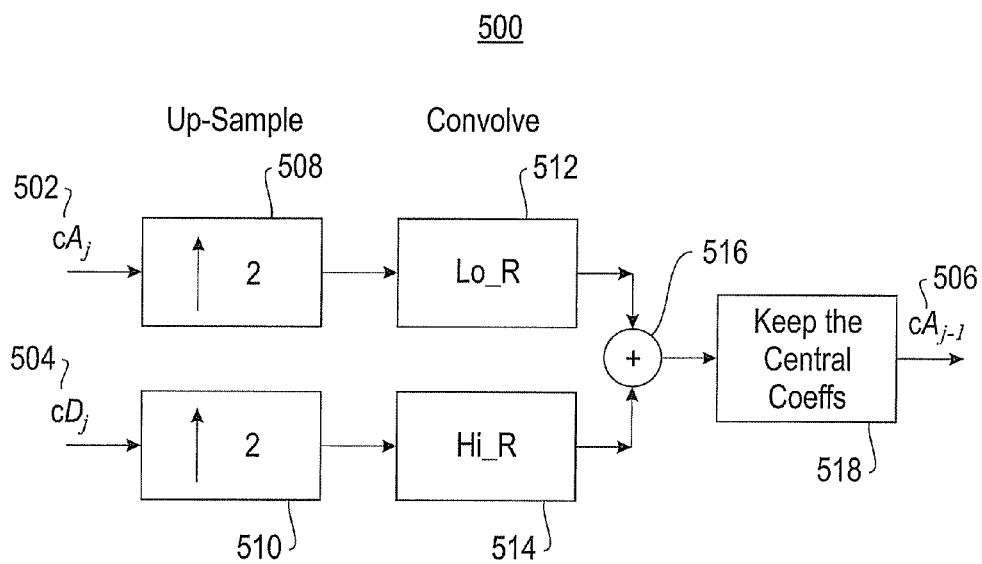
FIG. 5 depicts an exemplary process for data reconstruction using wavelet coefficients.

Turning now to FIG. 5, a process 500 for data reconstruction using the approximation and the detail wavelet coefficients is depicted, which may be implemented by the CL 124 of FIG. 1 in accordance with exemplary embodiments. From the approximation and detail coefficients, $cA_j$ 502 and $cD_j$ 504, an inverse discrete wavelet transform can reconstruct $cA_{j-1}$ 506 for input to the next level. In exemplary embodiments, $cA_j$ 502 is up-sampled by two using up-sampler 508. Similarly, $cD_j$ 504 is up-sampled by two using up-sampler 510. The up sampling performed by the up-samplers 508 and 510 may insert zeros at every other location, e.g., at odd indexed elements, to increase the sampling rate by a factor of two. Each up-sampled signal is respectively convolved with Low Pass and High Pass reconstruction filters, Lo_R 512 and Hi_R 514. The two convolved signals are summed at summing junction 516. In exemplary embodiments, only the central portion of the summed signal is extracted using block 518, resulting in the reconstructed value $cA_{j-1}$ 506.

Through maintaining the central coefficients using the block 518, the number of wavelet coefficients can be reduced with a minimal impact on total error introduced in the original signal, as illustrated in the following example. Assume that the original time series is represented as f(x). Further assume that in the transformed domain the series f(x) can be represented using the wavelet coefficients $C_1, C_2, \ldots C_m$. Let $\sigma$ be a permutation of $1 \ldots m$, and let $\overline{f(x)}$ be a function that can be represented using the coefficients corresponding to the first l numbers of the permutation $\sigma$. Thus, the error introduced in the original signal by dropping coefficients is given by $$\|f(x) - \overline{f(x)}\|^2 = \sum_{i=l+1}^{m} (C_{\sigma(i)})^2$$

Therefore, to minimize the error for any given l, the best choice may be the permutation that sorts the coefficients in order of decreasing magnitude; that is, $\sigma$ satisfies $|C_{\sigma(1)}| \geq |C_{\sigma(2)}| \geq \ldots \geq |C_{\sigma(m)}|$. Thus, if a coefficient is to be discarded by the CL 124 of FIG. 1, the coefficient which has the least absolute value is dropped, or assigned to a value of zero. Dropping coefficients can result in a greater degree of compression, at the cost of adding error.

In storing compressed data to the warehouse data 110 or the history data 112 of FIG. 1, various approaches may be taken to efficiently organize the data. In exemplary embodiments, the CL 124 of FIG. 1 groups older data series together to form a two-dimensional "image", and the image is compressed. For younger data, single dimensional series may be used, i.e., each series of historical data is compressed independently. The compressed series of historical data may be viewed as a matrix where the values in the rows are the (uncompressed) coefficients, and the columns are timestamps. In alternate exemplary embodiments, the CL 124 of FIG. 1 compresses data by columns rather than by rows. It will be understood that all of the compressed data may be treated as single dimensional series, rather than applying the two-dimensional image approach.

When new data is added to the warehouse data 110 or the history data 112 of FIG. 1, the CL 124 may have to merge data sets from different time frames that have different amounts of compression. Similarly, to apply higher amounts of compression to existing compressed frames, the CL 124 may merge two compressed data frames and apply a higher amount of compression on the merged frame. However, it may be difficult to merge the frames, since the historical data are stored in a transformed domain. For example, to merge two series it is insufficient to append their wavelet coefficients. One naïve way to merge two series is to reconstruct them completely from their respective coefficients, merge them and then recalculate the wavelet coefficients all over again. But this simple approach is very computationally intensive and may result in long delays while processing is performed.

In exemplary embodiments, the CL 124 of FIG. 1 merges two series in the transformed domain without reconstructing them, referred to as a time series merger with partial reconstruction. This process is described in reference to the following example. Consider a time series T where $T = \{t_1, t_2, \ldots, t_n\}$. Suppose that a one level decomposition of the series T yields approximation and decomposition vectors which are denoted as $A_1$ and $D_1$ respectively. Suppose that $A_1$ and $D_1$ each have $n_1$ elements. For reconstruction, $A_1$ and $D_1$ are up-sampled and then convolved with reconstruction filters of size 2p to generate $A'_1$ and $D'_1$, as described in process 500 of FIG. 5. The up-sampled $A_1$ and $D_1$ vectors will have $2n_1$ elements each. As previously described, the convolved signals $A'_1$ and $D'_1$ will have $2p + 2n_1 - 1$ coefficients. Since $A_1$ and $D_1$ are generated from T, it can be seen that:

$$n_1 = p + \frac{n-1}{2}$$

where n=number of elements in T

Thus $n = 2n_1 - 2p + 1$ \hfill (2)

The $i^{th}$ element in $A'_1$ and $D'_1$ may be denoted as $a'_i$ and $d'_i$ respectively. Hence, $$A'_1 = [a'_1, a'_2, \ldots, a'_{n_t}] \quad (3)$$

$$D'_1 = [d'_1, d'_2, \ldots, d'_{n_t}] \quad (4)$$

Note that because $A_1$ and $D_1$ are up-sampled, the $i^{th}$ element in $A_1$ and $D_1$ become the $2i^{th}$ element in the up-sampled $A_1$ and $D_1$ vectors. Therefore it can be seen that in $A'_1$; $a'_2, a'_3, \ldots, a'_{2p+2}$ and in $D'_1$; $d'_2, d'_3, \ldots, d'_{2p+1}$ are the values that are affected by the first coefficient in $A_1$ and $D_1$ respectively. Similarly, $a'_4, a'_5, \ldots, a'_{2p+4}$ and $d'_4, d'_5, \ldots, d'_{2p+4}$ are the values that are affected by the second coefficient in $A_1$ and $D_1$. In general, $a'_{2i}, a'_{2i+1}, \ldots, a'_{2p+2i-1}$ and $d'_{2i}, d'_{2i+1}, \ldots, d'_{2p+2i-1}$ are the values in $A'_1$ and $D'_1$ that are dependent on the $i^{th}$ coefficient in $A_1$ and $D_1$.

Assume that $S_{A'_1 D'_1}$ denotes the signal generated by summing $A'_1$ and $D'_1$. The number of points in the signal $S_{A'_1 D'_1}$ is given by $2p + 2n_1 - 1$. In order to obtain the original time series of historical data T, only the central n coefficients of $S_{A'_1 D'_1}$ should be kept. Therefore, $$\left\lfloor \frac{2p + 2n_1 - 2 - n}{2} \right\rfloor$$

terms may be discarded from the beginning. Using Equation (2) to replace n leads to $$\left\lfloor \frac{2p + 2n_1 - 2 - n}{2} \right\rfloor = \left\lfloor \frac{4p - 3}{2} \right\rfloor$$

The first point in T is therefore the $$\left\lfloor \frac{4p-3}{2} \right\rfloor$$

point in $S_{A'_1D'_1}$. Similarly, the second and third points in T are the $$\left\lfloor \frac{4p-3}{2} \right\rfloor + 1 \text{ and } \left\lfloor \frac{4p-3}{2} \right\rfloor + 2$$

points in $S_{A'_1D'_1}$. In general, the $i^{th}$ point in T is the $$\left\lfloor \frac{4p-3}{2} \right\rfloor + i - 1$$

point in $S_{A'_1D'_1}$.

Suppose that only the first x terms of the series T are desired for a partial reconstruction via the CL 124 of FIG. 1. In that case, only $$\left\lfloor \frac{4p-3}{2} \right\rfloor, \left\lfloor \frac{4p-3}{2} \right\rfloor + 1, \ldots, \left\lfloor \frac{4p-3}{2} \right\rfloor + x - 1$$

terms in $S_{A'_1D'_1}$ are kept. Therefore, the first t coefficients in both $A_1$ and $D_1$ are kept such that $$(2t + 2p - 1) \le \left\lfloor \frac{4p-3}{2} \right\rfloor + x - 1$$

while, $$(2t + 2p + 1) > \left\lfloor \frac{4p-3}{2} \right\rfloor + x - 1.$$

Similarly, to reconstruct the terms $x_1$ to $x_2$ in $A_{j-1}$, the coefficients starting from $t_1$ to $t_2$ ($t_2 > t_1$) are chosen such that $$2t_1 - 2 < \left\lfloor \frac{6p-3}{2} \right\rfloor + x_1 - 1$$

while $$2t_1 \ge \left\lfloor \frac{6p-3}{2} \right\rfloor + x_1 - 1$$

and also $$(2t_2 + 2p) \le \left\lfloor \frac{6p-3}{2} \right\rfloor + x_2 - 1$$

while $$(2t_2 + 1 + 2p) > \left\lfloor \frac{6p-3}{2} \right\rfloor + x_2 - 1.$$

Further consider the merger of two series $T_1$ and $T_2$, where $T_1$ has $n_1$ elements, while $T_2$ has $n_2$ elements. Suppose that $T_1 = \{t_{11}, t_{12}, \ldots, t_{1n_1}\}$ and $T_2 = \{t_{21}, t_{22}, \ldots, t_{2n_2}\}$. The merged series $T_3$ can be represented as $\{t_{11}, t_{12}, \ldots, t_{1n_1}, t_{21}, t_{22}, \ldots, t_{2n_2}\}$. A one level decomposition of the two series generates the wavelet coefficients $C_1 =$ $$C_1 = \left\{ c_{11}, c_{12}, \ldots, c_{1\left\lfloor p + \frac{n_1-1}{2} \right\rfloor} \right\}$$

and $$C_2 = \left\{ c_{21}, c_{22}, \ldots, c_{2\left\lfloor p + \frac{n_2-1}{2} \right\rfloor} \right\}$$

respectively.

As previously described in referenced to $C_1$, the wavelet coefficients $\{c_{11}, c_{12}, \ldots, c_{1\lfloor n_1/2 \rfloor}\}$ will not be affected by the merger. Similarly in $C_2$, the wavelet coefficients $$\left\{ c_{2p}, c_{2(p+1)}, \ldots, c_{2\left\lfloor p + \frac{n_2-1}{2} \right\rfloor} \right\}$$

will remain unchanged. In order to calculate the remaining coefficients, $T_1$ and $T_2$ are partially reconstructed. For $T_1$, the portion given by $\{t_{1(n_1-2p-1)}, t_{1(n_1-2p-2)}, \ldots, t_{1n_1}\}$ may be reconstructed, and for $T_2$, the first 2p elements given as $\{t_{21}, t_{22}, \ldots, t_{2(2p)}\}$ may also be reconstructed. Using the process specified above, the CL 124 of FIG. 1 can identify the coefficients needed to reconstruct these portions, and a partial reconstruction of the two series can be performed.

In exemplary embodiments, the CL 124 of FIG. 1 constructs a temporary series $T = \{t_{1(n_1-2p-1)}, t_{1(n_1-2p)}, \ldots, t_{1n_1}, t_{21}, t_{22}, \ldots t_{2(2p)}\}$ for calculating the wavelet coefficients. Out of the newly calculated coefficients, only the first 2p coefficients may be retained. These are the new coefficients generated because of the merger. The last p coefficients may be removed from $C_1$ along with the first p coefficients from $C_2$. The removed coefficients can be replaced with the newly calculated 2p coefficients.

When data is deleted from the warehouse data 110 or the history data 112 of FIG. 1, the CL 124 may have to remove data sets from different time frames that have different amounts of compression. One approach to data removal is to reconstruct the entire series, truncate the series, and then recalculate the wavelet coefficients for the remaining series. However, this approach is computationally expensive. Through exemplary embodiments, reconstruction of the entire series is avoided through partial time series reconstruction. As previously described in reference to the process of time series merger with partial reconstruction, the CL 124 of FIG. 1 can identify the coefficients needed to reconstruct a certain portion of the time series of historical data. For example, suppose that it is desired to remove a portion $\{t_{k+1}, t_{k+2}, \ldots, t_n\}$ from a time series $T = \{t_1, t_2, \ldots, t_n\}$. In exemplary embodiments, the CL 124 of FIG. 1 identifies the coefficients that are needed to reconstruct the remaining portion of the time series of historical data, e.g., $\{t_1, t_2, \ldots, t_k\}$. Once these coefficients are identified, the remaining coefficients may be discarded (e.g., the unidentified wavelet coefficients), and the data structures C 304 and L 306 of FIG. 3 can be updated accordingly.

In exemplary embodiments, the CL 124 of FIG. 1 enables compression of the wavelet coefficients. The process of compressing the wavelet coefficients is further described in the following example. Consider a time series $T=\{t_1, t_2, t_3, \ldots, t_n\}$. Assume that the CL 124 of FIG. 1 compresses this time series of historical data using the wavelet compression processes as previously defined. Suppose that compression of the times series of historical data yields the following wavelet coefficients $C=\{c_1, c_2, c_3 \ldots, c_n\}$ where $c_i$ is a floating-point number. C can be represented as $C=\{c_{11}c_{12}c_{13} \ldots c_{1n}, c_{21}c_{22}c_{23} \ldots c_{2n}, \ldots, c_{n1}c_{n2}c_{n3} \ldots c_{mn}\}$ where $c_{ij} \in \{0, 1, 2, 4, \ldots 9, \ldots, +, -\}$. Thus, the wavelet coefficients can be treated as a character stream. Using Huffman compression, the CL 124 of FIG. 1 may create a compressed representation of the wavelet coefficients. In exemplary embodiments, a Huffman dictionary of the compressed wavelet coefficients is periodically updated to ensure that a change in the probability distribution of the coefficients is taken into consideration. Through compressing the wavelet coefficients themselves, a greater degree of total compression can be achieved.

To determine the effectiveness of the compression applied by the CL 124 of FIG. 1, an error metric may be calculated. The error metric can be used for a variety of purposes. For example, the error metric may be useful to a system administrator for determining whether the compressed historical data is accurate enough to support analyzing system performance. The process of calculating the error metric is further described in the following example. Consider time series of historical data $T=\{t_1, t_2, t_3 \ldots, t_n\}$. The time series data of historical data can be compressed using the compression schemes previously described. Further assume that reconstruction of the compressed signal yields a new time series of historical data $T'\{t'_1, t'_2, t'_3, \ldots, t'_n\}$. The error metric may be calculated as a mean square error (MSE) between T and T' as given by $$MSE = \sqrt{\frac{1}{n}\sum_{i=1}^{n}(t_i - t'_i)^2} \quad (5)$$

It will be understood that numerous other error metrics may be calculated in accordance with exemplary embodiments.

If a user specifies a requested error tolerance value, then the CL 124 of FIG. 1 can drop the wavelet coefficients until the requested error tolerance value is achieved. The error introduced by dropping a coefficient may be calculated using equation (5) above. Likewise, if the user specifies an amount of available storage as a space constraint, then the CL 124 of FIG. 1 can estimate the number of coefficients that need to be dropped to achieve the corresponding storage space constraint. Once an estimate of the number of coefficients that need to be dropped has been made, the CL 124 of FIG. 1 calculates the approximate amount of error that will be introduced as a result.

Technical effects of exemplary embodiments may include compression and decompression of historical data as time frames, where each time frame can be compressed with varying amounts of compression resolution. Further technical effects may include applying adaptive compression ratios depending on space constraints and/or error tolerances specified by a user. Thus, through exemplary embodiments, a user can perform a tradeoff between computational complexity, accuracy of archival data, and total storage requirements.

Advantages may include efficient archival of historical data related to database system performance and efficient reconstruction of the historical data from the archived data. Efficiencies may be achieved through applying a greater amount of compression to data that does not need a high degree of accuracy (e.g., older data), while applying a lesser amount of compression to data that can benefit from a greater degree of accuracy (e.g., younger data), resulting in multi-resolution historical data. Through exemplary embodiments, the growth of the storage space required for archiving data can be controlled through modifying the amount of compression applied to varying portions of the data.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, universal serial bus (USB) flash drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for a multi-resolution storage scheme for historical data, comprising:
   dividing, on a computer, historical data into a plurality of time frames;
   determining, on the computer, an amount of compression for each of the time frames, wherein at least two of the time frames have a different amount of compression;
   compressing, on the computer, a plurality of series of the historical data in multiple dimensions, wherein the amount of compression for each of the time frames is applied via a wavelet transform and output as wavelet coefficients resulting in multi-resolution historical data with older series of the historical data compressed as a two-dimensional image and younger series of the historical data compressed in a single dimension;
storing the multi-resolution historical data;
reconstructing, on the computer, the historical data through applying an inverse wavelet transform to the wavelet coefficients;
calculating, on the computer, an error metric as a mean square error between the historical data and the reconstructed historical data; and
outputting the error metric.

* * * * *